Sept. 5, 1950         J. J. MALACHOWSKI         2,521,383
TOOL FOR THE FITTING OF TIRES TO THE RIMS
OF THE WHEELS OF MOTOR VEHICLES
Filed Oct. 5, 1949
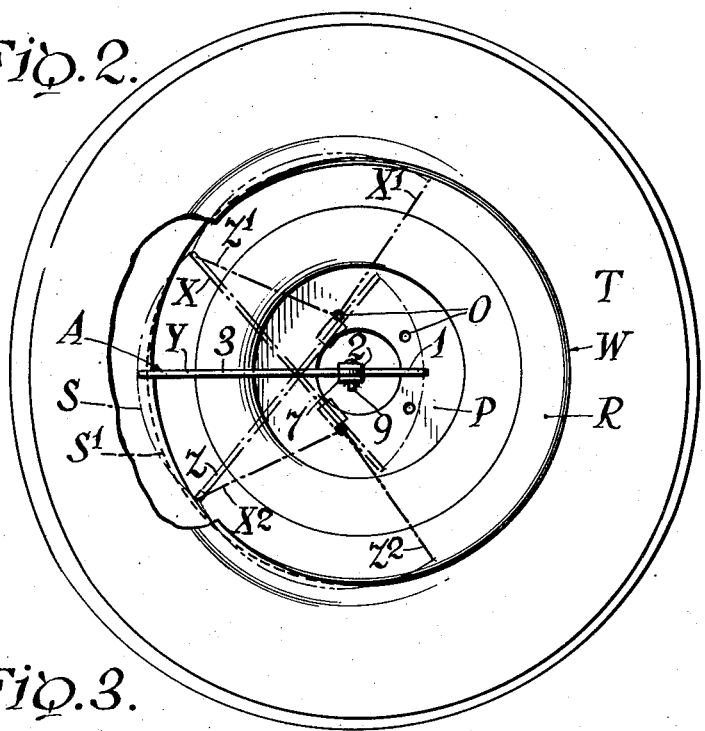
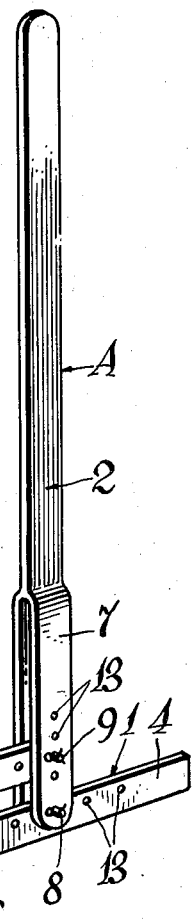
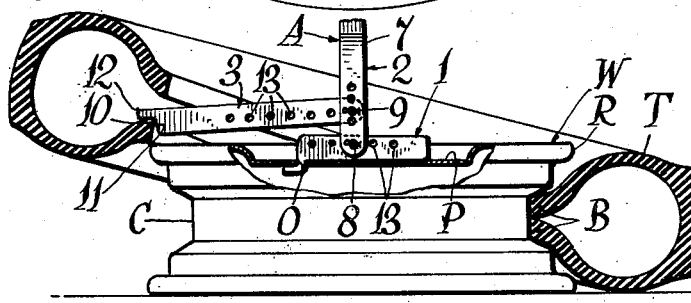
Inventor
Joseph J. Malachowski,
By
Attorney Patented Sept. 5, 1950

2,521,383

UNITED STATES PATENT OFFICE 2,521,383

TOOL FOR THE FITTING OF TIRES TO THE RIMS OF THE WHEELS OF MOTOR VEHICLES

Joseph J. Malachowski, Buffalo, N. Y.

Application October 5, 1949, Serial No. 119,641

3 Claims. (Cl. 157—1.3)

This invention relates to improvements in tools for the fitting of tires to the rims of the wheels of motor vehicles.

A motor vehicle wheel of the construction currently used includes a central plate which is bolted to the adjacent brake drum and has an annular series of holes for the bolts, the plate being connected to a rim which has a centrally located annular channel to accommodate the beads of the tire.

The general practice of service stations and garages in connection with the application of a tire to the rim is to use a chisel and hammer. This practice frequently causes injury to the beads of the tire and the mutilation of the rim. In any event it is time consuming and laborious, the more so as greater care may be exercised in the effort to avoid mutilation of the rim and the beads of the tire.

The object of the invention is to provide a simply constructed and inexpensive tool for the purpose stated by means of which a tire may be accurately fitted to a rim with ease and facility in a minimum period of time, specifically two minutes more or less, and wherein all liability of the mutilation of the beads of the tire or the rim is avoided.

In the attainment of this object the improved tool is formed for operative association with the wheel in a manner such that, for the purpose of the repetition of the bead fitting operation at different points along the periphery of the rim, it may be conveniently and quickly shifted from point to point. Stated more particularly the improved tool consists of but three elements, namely, an anchoring element which bears against the wheel plate that is bolted to the adjacent brake drum and which utilizes any one or more of the holes in the plate for the purpose of a pivotal relation, a lever element pivoted to the anchoring element, and a tire bead engaging and pushing element pivoted to the lever element.

In the accompanying drawing:

Figure 1 is a perspective view of the improved tool.

Figure 2 is a side elevation of a vehicle wheel showing the tire in the course of its application to the wheel, the tire being partly broken away, and also showing the tool of the present invention in association with the wheel, various operative positions of the tool being shown in dot and dash lines.

Figure 3 is a view showing the same parts that are shown in Figure 2, the tire being shown in diametrical section, the rim being shown in plan and partly broken away with the wheel plate shown in diametrical section and the tool being shown in side elevation with its tire bead engaging and pushing element in operative relation to the inner bead of the tire.

Figure 4 is a view similar to Figure 3 but showing the tire bead engaging and pushing element in operative relation to the outer bead of the tire.

The wheel, indicated generally at W, includes the rim R and the plate P at one side of the rim and connected thereto and by means of which the wheel is attached to the adjacent brake drum. The rim R is formed with the usual channel C and the wheel carries a tire T, the beads B of which are engaged in the usual manner in the channel C. The plate P is attached to the adjacent brake drum by means of fastening bolts (the brake drum and the fastening bolts not being shown) and for the accommodation of the fastening bolts is formed with openings O.

The tool of the present invention, indicated generally at A, consists of three structural elements, namely an anchoring element 1, a lever element 2 and a tire bead engaging and pushing element 3. The anchoring element 1 consists of a straight bar portion 4 which has a uniform bearing against the plate P and is formed at one end with an offset terminal extension 5 extending in the same lineal direction as the bar 4 and connected to it by a shoulder portion 6 of disc shaped cross section. The shoulder portion 6 extends substantially at a right angle to the bar 4 and the terminal extension 5. The lever element 2 preferably has a forked inner portion 7, the sides of which straddle the bar 4 and are pivotally connected to it by a pin 8. The tire bead engaging and pushing element 3 is in the form of a straight bar which at its inner end extends between the sides of the fork 7 and is pivotally connected to the fork by a pin 9 and at its outer end is formed with an angular recess 10 providing a shoulder 11 and a projecting finger 12 mutually related at any angle suitable for practical operation, e. g. an angle of 90° or slightly more. In order that the tool may readily be adapted to tires and wheels of different diametrical dimensions each of the elements 1, 2 and 3 is formed in the direction of its length with a row of openings 13 which provide in the obvious manner for appropriate locations of the pivot pin 8 relatively to the element 1 and of the pivot pin 9 relatively to either or both of the elements 2 and 3.

When a tire is to be fitted to a rim the wheel is removed from the vehicle, the tool is operatively associated with the wheel and the tire to be mounted upon the rim, in a canted position as shown in Figure 2, has its beads B engaged in the channel C to the extent possible prior to stretching the tire to complete the engagement of the beads in the channel, this extent being of the order of a half circle or somewhat less.

The association of the tool with the wheel is effected by initially positioning the anchoring element 1 at a substantial right angle to the plate P and inserting the extension 5 through one of the holes O after which the element 1 is swung downward until its bar 4 uniformly engages the outer face of the plate P, as shown in Figures 2 and 3, at which time the extension 5 engages the inner face of the plate P and the shoulder portion 6 is fitted in the hole O through which the extension 5 was initially inserted. The extension 5 by its engagement with the inner face of the plate P completes the association of the tool with the wheel, that is to say, prevents the disengagement of the tool from the plate P. The shoulder portion 6 as fitted in the hole O serves as a pivot for the tool relatively to the plate P and enables the tool to be shifted pivotally from point to point.

When the tire has been partially fitted to the rim, as above explained, the shoulder 11 of the element 3 is engaged against the inner circumferential face of the inner bead with the finger 12 overlying the inner lateral face of the inner bead. The lever 2 is then swung forwardly, i. e. to the left, Figure 2 of the drawing being considered, to cause the element 3 to stretch the inner bead of the tire to an extent such that it will pass over the periphery of the rim at its side and to direct the bead in the stretched area over the periphery of the rim, as shown, for example, in Figure 3. For this operation three positions of the tool are shown in Figure 2 at X, Y and Z, the tool being shown in positions X and Z in dotted lines and in position Y in full lines. It may be assumed that position X is the starting position, position Z is the finishing position and position Y is the median position. After each bead pushing or stretching operation of the element 3 the lever 2 is pulled back and the tool is shifted about the shoulder portion 6 as a pivot in order that the shoulder 11 may be engaged against the inner circumference face of the inner bead at another appropriate point. Three or four manipulations of the lever 2 within the permissible zone of the tool shifting movement are ordinarily all that is required.

These operations are continued throughout the angle between positions X and Z, this angle conforming to the permissible arc of movement, indicated in Figure 2 by the dot and dash line S, of the shoulder 11, that is to say, the arc which terminates at points of coincidence with the periphery of the rim at its sides, such periphery being indicated in Figure 2 by the dotted line S'.

In a number of cases, depending on the maximum diametrical dimension of the rim and the particular adjustment of the pivot pins 3 and 9, the positioning of the inner bead of the tire over the periphery of the rim may be completed with the shoulder portion 6 in the opening O in which it was originally fitted, the bead at such time being alined with the channel C as shown in Figure 3. In other cases it may be necessary, for the complete positioning of the inner bead over the periphery of the rim, to move the shoulder 6 from the opening O in which it was originally engaged to an adjacent opening O and to repeat the operations described. This is sufficiently indicated in Figure 2 which assumes that the shoulder 6 was originally positioned in an opening O above the opening in which it is shown, such original positioning of the tool being indicated by the dot and dash lines X' and Z' angularly related in conformity with the range of angular shifting of the tool about the shoulder 6 as a pivot, and was finally positioned in an opening O below the opening in which it is shown, such final positioning of the tool being similarly indicated by the dot and dash lines $X^2$ and $Z^2$. In connection with the dot and dash lines X'—Z' and $X^2$—$Z^2$ the arc of movement of the tool is indicated by dot and dash lines and the periphery of the rim at its side by dotted lines, these lines respectively corresponding to the lines S and S' above described.

When the inner bead of the tire has been positioned over the periphery of the rim, as above described, the same operations are repeated with respect to the outer bead of the tire, this phase being shown in Figure 4. Whereas when the tool is used to fit the inner bead of the tire to the rim the finger 12 overlies the inner lateral face of the inner bead, when the tool is used to fit the outer bead of the tire to the rim the finger 12 overlies the outer lateral face of the outer bead. When a sufficient extent of the outer bead of the tire has been positioned over the periphery of the rim the continued use of the tool is unnecessary, mere hand pressure upon the tire serving to complete the operation of applying a tire to the rim.

I claim:

1. For use with tire carrying wheels of the type wherein the wheel rim has a central channel to accommodate the beads of a tire and an attachment plate is connected to the rim at one side thereof and is formed with openings to accommodate bolts for the attachment of the wheel to an adjacent brake drum; a tool for the fitting of a tire to a rim so characterized comprising an anchoring element, a lever element and a tire bead engaging and pushing element, the anchoring element consisting of a straight bar portion, an offset terminal extension projecting in the same lineal direction as the straight bar portion and a shoulder portion connecting the straight bar portion and the terminal extension and extending substantially at a right angle thereto, the lever element being pivotally connected at its inner end to the anchoring element between its ends, and the tire bead engaging and pushing element being pivotally connected to the lever element between its ends and having its free end formed for operative engagement with the inner circumferential face of each bead of the tire.

2. A tool as set forth in claim 1 wherein the free end of the tire bead engaging and pushing element is formed with an angular recess which provides a shoulder for operative engagement with the inner circumferential face of each bead of the tire and a finger projecting from the shoulder to overlie a lateral face of either bead of the tire, the finger and the shoulder being related at an angle of the order of 90°.

3. A tool as set forth in claim 1 wherein the pivot which connects the lever element and the anchoring element is adjustable along the length of the anchoring element and the pivot which connects the lever element and the tire bead engaging and pushing element is adjustable along the length of each of the elements which it connects.

JOSEPH J. MALACHOWSKI.

REFERENCES CITED

The following references are of record in the file of this patent:

UNITED STATES PATENTS

| Number | Name | Date |
| --- | --- | --- |
| 1,639,887 | Hatfield | Aug. 23, 1927 |